United States Patent [19]

Smith et al.

[11] Patent Number: 5,538,702
[45] Date of Patent: Jul. 23, 1996

[54] GAS STREAM PURIFICATION APPARATUS

[75] Inventors: James R. Smith, Blackford; Peter L. Timms, Bristol, both of England

[73] Assignee: The BOC Group plc, Windlesham

[21] Appl. No.: 194,546

[22] Filed: Feb. 8, 1994

[30] Foreign Application Priority Data

Feb. 11, 1993 [GB] United Kingdom ............... 9302751
Feb. 11, 1993 [GB] United Kingdom ............... 9302752

[51] Int. Cl.$^6$ .................... C01B 25/00; C01B 25/06; B01D 53/34
[52] U.S. Cl. .................... 423/210; 423/299; 423/322; 117/954; 117/955
[58] Field of Search ............... 423/210, 299, 423/322; 117/104, 954, 955

[56] References Cited

U.S. PATENT DOCUMENTS

| | | | |
|---|---|---|---|
| 4,258,018 | 3/1981 | Powell | 423/210 |
| 4,355,010 | 10/1982 | Jödden et al. | 423/210 |
| 4,442,077 | 4/1984 | Foster et al. | 423/210 |
| 4,551,197 | 11/1985 | Guilmette et al. | 156/642 |
| 4,565,677 | 1/1986 | Yusa | 423/219 |
| 5,096,681 | 3/1992 | Cheung | 423/245.1 |
| 5,417,934 | 5/1995 | Smith et al. | 422/177 |

FOREIGN PATENT DOCUMENTS

| | | | |
|---|---|---|---|
| 0121339 | 10/1984 | European Pat. Off. | |
| 0611140A1 | 8/1994 | European Pat. Off. | |
| 2944288A1 | 5/1981 | Germany. | |
| 62-235434 | 10/1987 | Japan | 423/210 |
| 63-156537 | 6/1988 | Japan | 423/240 S |
| 63-162025 | 7/1988 | Japan | 423/210 |
| 8911905 | 12/1989 | WIPO | 423/240 S |

*Primary Examiner*—Gary P. Straub
*Assistant Examiner*—Timothy C. Vanoy
*Attorney, Agent, or Firm*—David M. Rosenblum; Larry R. Cassett

[57] ABSTRACT

A method for the treatment of a stream of exhaust gases including phosphine in which the stream is heated to a sufficiently high temperature to decompose the phosphine to phosphorus vapor and the stream is then passed into a reactor containing calcium oxide heated to above about 100° C. An oxygen containing stream is also passed into the reactor.

11 Claims, 2 Drawing Sheets

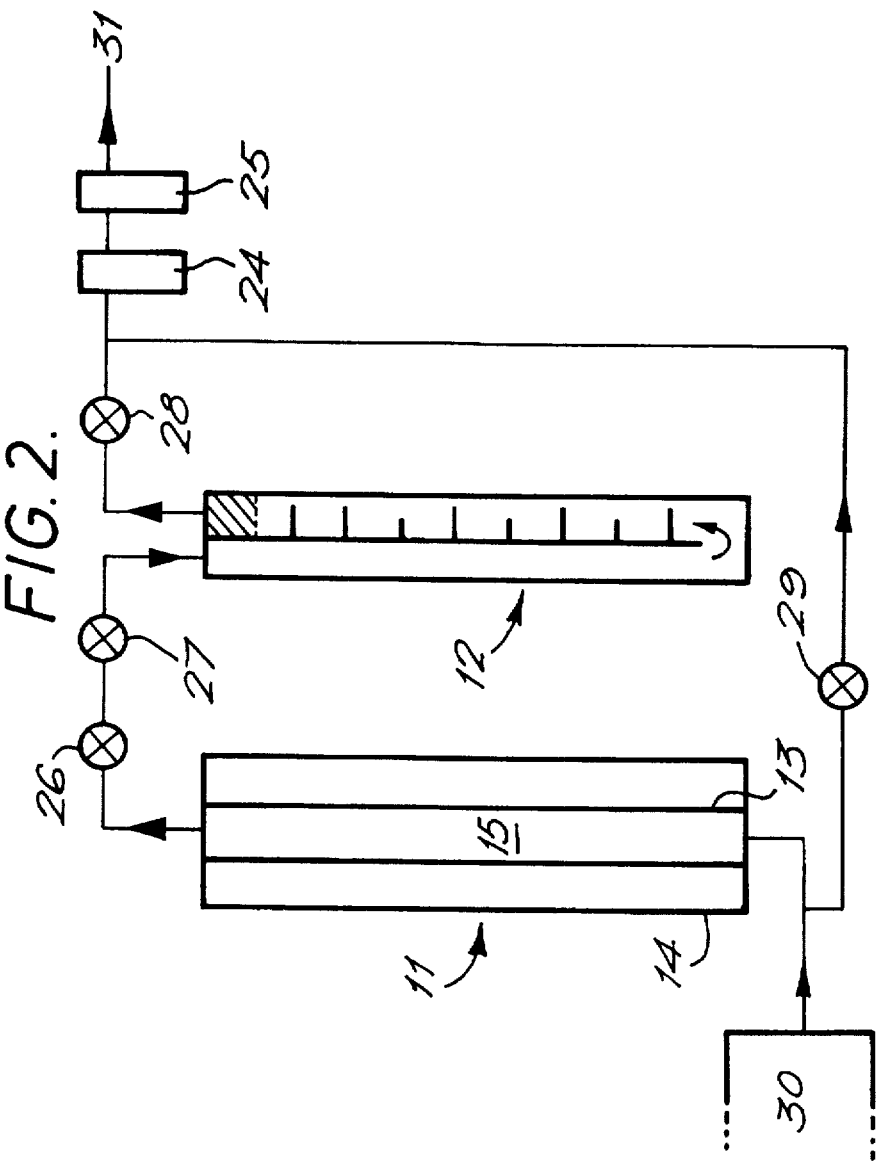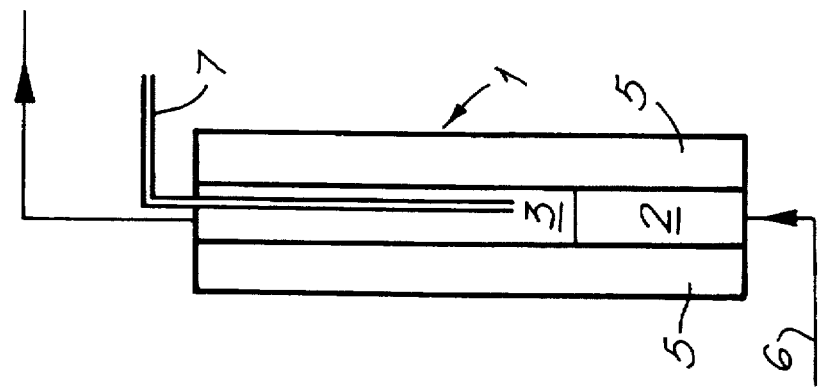

GAS STREAM PURIFICATION APPARATUS

BACKGROUND OF THE INVENTION

This invention relates to the purification of gas streams and more particularly, of those gas streams which result from the production of semi-conductor devices and which contain noxious substances, especially compounds of arsenic or phosphorus.

In our patent specification WO 89/11905 we describe processes and apparatus for the scrubbing of noxious substances from exhaust gases, particularly those emanating from semi-conductor production chambers in which the noxious substances may themselves be used either as the etching gases used in the production or in the plasma enhanced chemical vapor deposition (PECVD) on to semi-conductor materials.

The process described in our prior patent specification comprise contacting the exhaust gases with:

i) a silicon stage preferably having a purity of more than 90 % and most preferably more than 97%, for example a crystalline or polycrystalline material with a purity of about 98.5%; the silicon may be mixed with "inert" substances such as silica or alumina or with lime (CaO) or magnesia (MgO) or even be alloyed with one or more of the metals chromium, manganese iron, cobalt or nickel, for example in the form of ferrosilicon or manganese-silicon or possibly silicon carbide.

An addition of copper (or a copper rich material) to the silicon stage may be beneficial.

ii) a calcium oxide stage in which the calcium oxide may be in the form of calcium oxide itself, lime, soda lime (calcium hydroxide with sodium hydroxide or potassium hydroxide), any form of which may also contain "inert" materials such as graphite (or coke), limestone ($CaCO_3$), magnesia $MgCO_3$ or slaked lime ($Ca(OH)_2$). Overall this stage can be represented as a calcium oxide or a calcium oxide compound or a calcium oxide containing material or a soda lime containing medium.

iii) an optional stage in which the active ingredient is a copper oxide (CuO or $Cu_2O$) which may be present on calcium silicate supporting medium or on a calcium oxide/calcium silicate supporting medium.

The processes are operated at elevated temperatures. In particular:

i) the silicon stage is heated above 200° C. and preferably maintained between 350° and 500° C.

ii) the calcium oxide stage is heated above 100° C. and preferably maintained between 250° and 550° C.

iii) the copper oxide stage is maintained between 150° C. and 600° C. preferably between 200° and 400° C.

These different stages may conveniently be placed in apparatus comprising a single cylindrical tube, and with the stages spaces apart within the tube, about which are positioned a plurality of heating means, thermal insulation means and temperature sensing means, for example thermocouple devices, along the length of the tube.

The processes are basically designed to be general purpose ones for the elimination of substantially all the noxious gases emanating from semi-conductor production chambers in particular by rendering the gases harmless by chemical reaction in one or more of the stages.

In certain isolated circumstances, however, there may be a need to ensure that particularly noxious substances, or process reaction products from those substances, are fully eliminated from the gas stream.

In the case of the hydrides of arsenic and of phosphorus, i.e. arsine and phosphine respectively, these tend thermally to decompose at the preferred operating temperatures of the silicon and calcium oxide stages to form elemental arsenic and phosphorus respectively and these also tend to remain in the vapor phase at such temperatures.

Our prior specification recommends the use of the optional copper oxide stage as the hydrides themselves as well as the elemental arsenic and phosphorus will react with the copper oxide stage to form copper arsenate and copper phosphate (both solids) respectively.

The present invention is concerned with the provision of a further means to ensure that these very noxious substances are eliminated and/or rendered harmless.

SUMMARY OF THE INVENTION

In accordance with the invention, there is provided a method for the treatment of a stream of exhaust gases including phosphine, which comprises heating the stream to a sufficiently high temperature to decompose the phosphine to phosphorus vapor and passing the stream together with an oxygen containing stream into a reactor containing calcium oxide heated to above about 100° C. The oxygen containing stream can comprise either air, oxygen enriched air or oxygen of high purity, for example, above about 90%.

Advantageously, the stream is heated to allow the decomposition of the phosphine by causing it to contact a heated surface or bed having a surface or bed temperature of above about 200° C.

Silicon is a suitable substance for the surface or bed. As in the case of our previous invention described above, the silicon preferably has a purity of more than about 90% and most preferably more than about 97%, for example a crystalline or polycrystalline material with a purity of about 98.5%; the silicon may be mixed with "inert" substances such as silica or alumina or with lime (CaO) or magnesia (MgO) or even be alloyed with one or more of the metals chromium, manganese iron, cobalt or nickel, for example in the form of ferrosilicon or manganese-silicon or possibly silicon carbide.

With regard to the calcium oxide, this may be in the form of calcium oxide itself, lime, soda lime (calcium hydroxide with sodium hydroxide or potassium hydroxide), any form of which may also contain "inert" materials such as graphite (or coke), limestone ($CaCO_3$), magnesia $MgCO_3$ or slaked lime ($Ca(OH)_2$). Overall this stage can be represented as a calcium oxide or a calcium oxide compound or a calcium oxide containing material or a soda lime containing medium.

Preferably, the oxygen containing stream, for instance, air is introduced in to the calcium oxide (or equivalent) part of the reactor, most preferably at that part adjacent the surface or bed of silicon (or whatever) if present.

Preferably, the stream is heated in order to decompose the phosphine to phosphorus vapor (and hydrogen) in contact with a surface or bed above about 350° C. most preferably above about 500° C.

Also preferably, the calcium oxide is heated above about 350° C. preferably above about 500° C. The reactor may have a common heating system for both the heated surface or bed and the calcium oxide.

In general the phosphine will be thermally decomposed on the surface of the heated surface/bed (and also on the calcium oxide) with the calcium oxide promoting the decomposition and the calcium oxide also tending to react with the resulting elemental phosphorus vapor to form calcium phosphate.

It has been found that the introduction of oxygen (or air) greatly enhances the above reaction to form calcium phosphate.

The production of calcium phosphate in this way results in a substantially involatile substance "trapped" in the surface of the reactor, thereby avoiding the presence of dangerous phosphorus vapors.

It should be noted, however, that the decomposition of phosphine forms hydrogen and it is very expedient to limit the amount of oxygen introduced in to the reactor such that the ratio of air to hydrogen does not exceed a range of about 1 and 25 and the ratio of oxygen to hydrogen does not exceed a range of about 1 and 100 both by volume.

Preferably, air is introduced in to the reactor, for example from a supply of compressed air at a rate of, say, about 200 l/hour. A non-return valve should be employed.

In cases in which the exhaust gas stream contains both phosphine and arsine, the stream may be treated in exactly the same manner as in the case of a phosphine-containing stream only, and this is included in the scope of the present invention.

In such cases, both phosphine and arsine will be thermally decomposed and the resulting phosphorus and arsenic vapors will then form calcium phosphate and calcium arsenate respectively, all as described above for phosphine alone. The temperatures and limits on the presence of hydrogen/oxygen levels and all other parameters are also the same.

However, in preferred embodiments of the invention when both phosphine and arsine are present in the gas stream, condenser means are provided prior to the introduction of oxygen and/or air in to the reactor at a temperature to condense the arsenic vapor but not the phosphorus vapor. Preferably, the condensing temperature is about 100° C.

The uncondensed phosphorus vapor can then be treated by the oxygen/air as described above. Generally, two heating stages will be required at the temperatures stated above, a first one to decompose the phosphine and the arsine prior to the arsenic condensing step and a second one prior to the oxygen/air treatment of the resulting arsenic-free stream to oxidize the phosphorus vapor in the presence of calcium oxide (or equivalent) in accordance with the invention.

BRIEF DESCRIPTION OF THE DRAWINGS

For a better understanding of the invention, reference will now be made, by way of exemplification only, to the accompanying drawings in which:

FIG. 1 shows an apparatus tbr performing a method according to the invention for the removal of phosphine or of phosphine and arsine from an exhaust stream.

FIG. 2 shows an apparatus for the pre-treatment of a gas stream containing both phosphine and arsine to remove arsenic by condensation.

DETAILED DESCRIPTION

Figure 3:
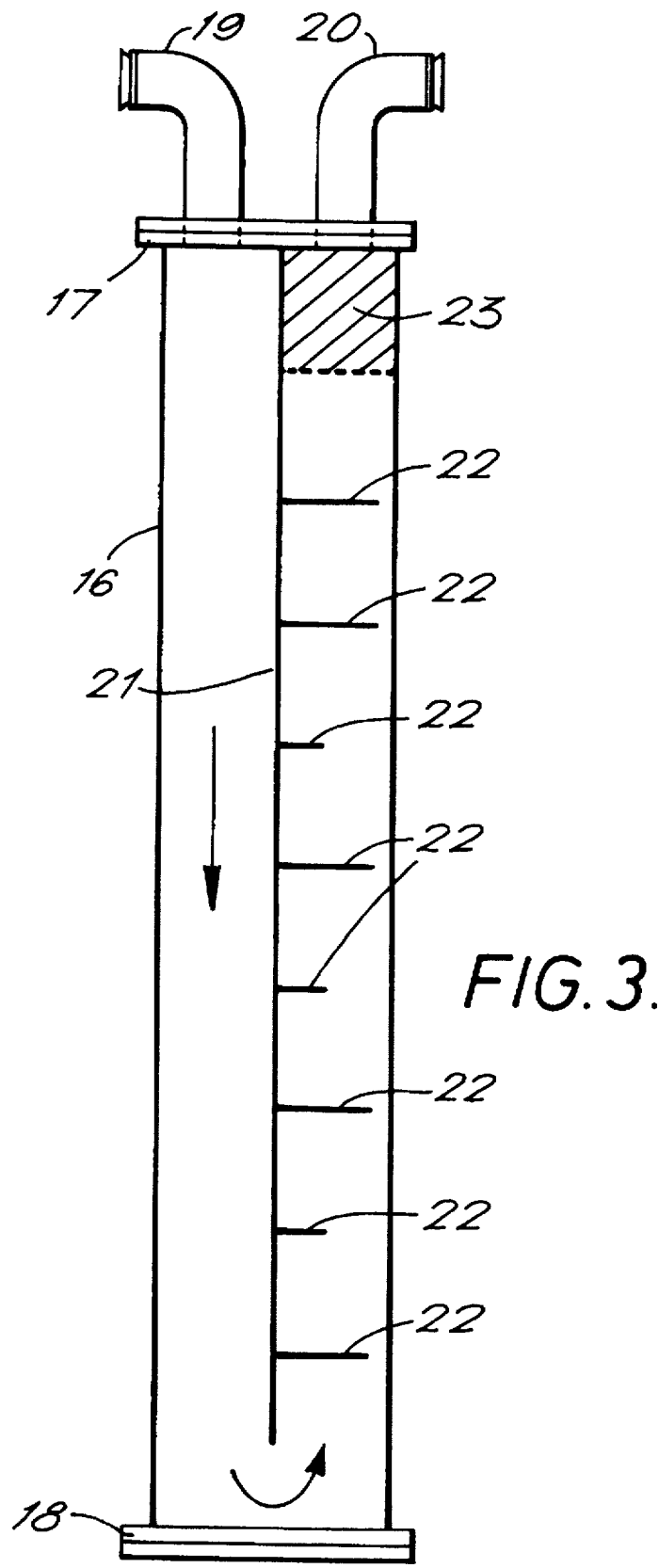
FIG. 3 shows an enlarged vertical section through the condenser means of FIG. 2.

With reference to FIG. 1, there is shown apparatus of the invention which comprises a reactor column shown generally at 1 and having a first stage 2 of silicon and a second stage 3 of calcium oxide in the form of lime.

The reactor column comprises a stainless steel tube for containing the first and second reagent stages which is surrounded by an outer cylindrical jacket 5 containing thermal insulation material and means for heating the reactor colunto to the desired temperature(s).

Means are provided in the form of a tube 6 which is sealed to the lower surface of the reactor column 1 to introduce an exhaust gas stream into the column and via the first stage 2 and then via the second stage 3.

Means are also provided in the form of a pipe 7 to introduce a stream of air into the lower part of the second stage 3 (adjacent the upper part of the first stage 2. The air stream is provided from a cylinder of compressed air (not shown).

In general, the apparatus of the invention is suitable for the recovery of arsine and phosphine from exhaust gas streams (particularly nitrogen-based streams) by means of the reactions discussed above.

If desired, there may optionally be provided a charcoal bed at the outlet of the column 1 through which any unreacted phosphorus vapor may be trapped.

Turning to FIG. 2 there is shown apparatus for the treating a gas stream containing both arsine and phosphine in accordance with an embodiment of the invention in which the arsine in particular is decomposed to arsenic vapor and thereafter selectively condensed from the stream. The apparatus comprises gas treating means generally shown at 11 and condenser means generally shown at 12. The gas heating means 11 has a central cylindrical tube 13 made of stainless steel and surrounded by an outer steel cylindrical jacket 14. Within the jacket 14 and outside the tube 13 are thermal insulation material and heating means adjacent the tube 13 together with thermocouple devices for temperature measurement, none of which is shown specifically.

Within the tube 13 is a substance 15 providing a heated bed for heating a gas stream passed through the tube. In this particular example, the substance comprises granular silicon (98.5% pure).

The condenser means is shown more clearly in FIG. 3. It comprises a stainless steel cylindrical tube 16 sealed by plates 17, 18 at its ends with the plate 17 having inlet pipe 11 and outlet pipe 20 attached thereto and both communicating with the interior of the tube 16.

A centrally positioned stainless steel plate 21 divides the interior of the tube 16 except at the lowermost portion of the tube so that gas entering via the inlet pipe 11 has to pass down the length of the tube 16 and then up the length of the tube before exiting via the outlet pipe 20.

In that part of the tube 16 in which the gas passes upwards, i.e. the right hand half as shown in FIG. 3, semi-circular, steel baffle plates 22 attached to the plate 21 constrict the passageway. In addition, an optional feature shown in FIG. 3 is a filter 23, for example a charcoal bed, held at the top of this passageway through which the gas must pass prior to exiting the tube 16.

The apparatus shown also includes further (or alternative) filter beds 23,24 of standard design and again comprising charcoal and valves 26,27,28 and 29.

In use of the apparatus with valve 29 closed and valves 26,27 and 28 open, exhaust gases from a semi-conductor reaction chamber 30 are caused to flow via the exhaust of a vacuum pump (not shown) in to the gas treatment means 11 and then into the condenser means 12. The silicon 15 is held at a temperature of about 500° C. so that the phosphine and arsine present in the gas stream will decompose to form phosphorus and arsenic vapors which then passes in to the condenser means 12. Condenser means 12 is held at a temperature of about 100° C. to effect condensation of the arsenic but not the phosphorus. The presence of the baffle plates 22 assists in allowing greater heat exchange contact between the gas stream and the condenser.

At such a temperature, the elemental arsenic will condense (or sublime) on the internal surfaces of the condenser at that temperature. (The terms "condenser" and "condensation" used herein include such sublimation).

The non-condensed constituent (phosphorus) leaves the condenser via the filter 23 (if present), the outlet pipe 20 and then passes through the filters 24 and 25 (if present).

The resulting gas stream passing down the line 31 is thereby substantially free of arsenic but contains phosphorus vapor which is then passed to the type of apparatus shown in FIG. 1 (at line 6) for the effective removal of phosphorus therefrom in accordance with the invention. Preferably the line 31 is kept warm by external heating means to prevent the possibility of phosphorus vapor condensing in the line.

We claim:

1. A method for the treatment of a stream of exhaust gases including phosphine, which comprises heating the stream to a sufficiently high temperature to decompose the phosphine to phosphorus vapor and passing the stream together with an oxygen containing stream into a reactor containing calcium oxide heated to a temperature of above about 100° C.

2. The method according to claim 1 in which the stream is heated by causing it to contact a heated surface or bed having a surface or bed temperature of above about 200° C.

3. The method according to claim 2 in which the heated surface or bed comprises silicon.

4. The method according to claim 1 in which the stream of exhaust gases are first introduced into a heated silicon part of the reactor adjacent to a calcium part of the reactor and the oxygen containing stream is introduced in to the calcium oxide part of the reactor.

5. The method according to claim 2 in which the surface or bed is heated to above about 350° C.

6. The method according to claim 5 in which the surface or bed is heated to above about 500° C.

7. The method according to claim 1 in which the calcium oxide is heated to above about 350° C.

8. The method according to claim 7 in which the calcium oxide is heated to above about 500° C.

9. The method according to claim 1, in which the exhaust gas stream contains both arsine and phosphine and in which the stream is heated sufficiently to decompose the arsine and phosphine to arsenic and phosphorus vapors respectively.

10. A method according to claim 9 in which condenser means are provided prior to the introduction of oxygen containing gas stream in to the reactor at a temperature to condense the arsenic vapor but not the phosphorus vapor.

11. A method according to claim 10 in which the condensing temperature is about 100° C.

* * * * *